Sept. 3, 1929.  G. N. WOLFE  1,727,262
VELOCIPEDE
Filed April 4, 1927
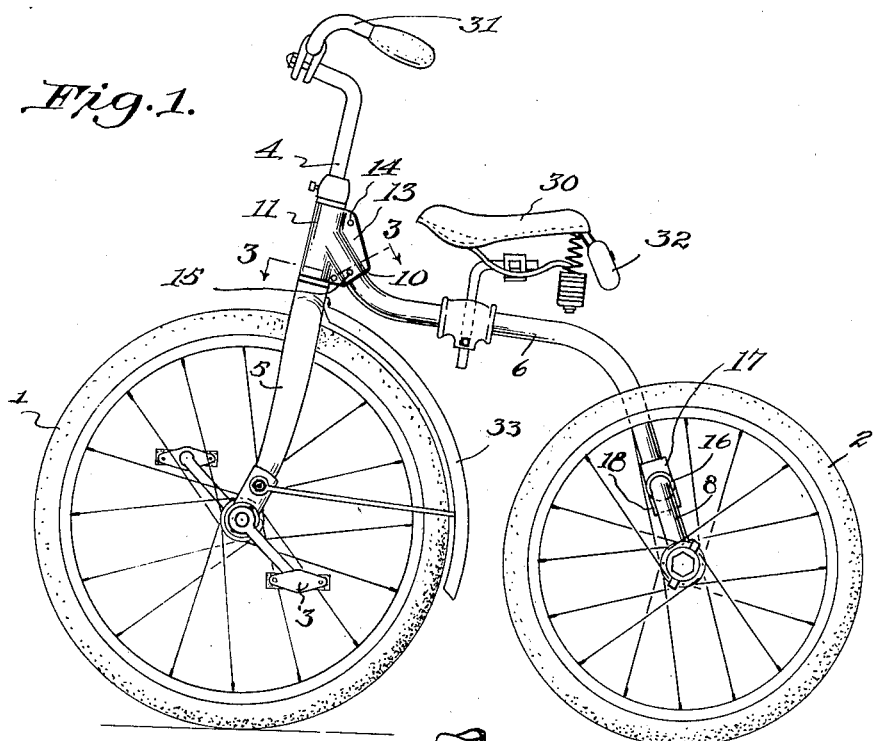
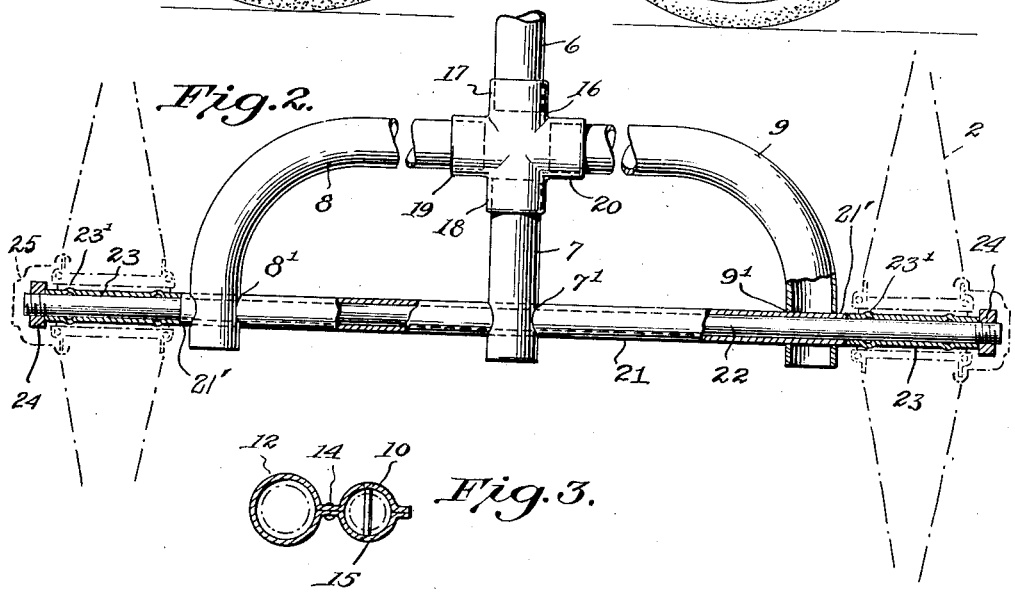
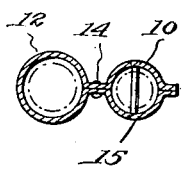
Inventor
George N. Wolfe
Eccleston & Eccleston,
Attorneys Patented Sept. 3, 1929.

1,727,262

UNITED STATES PATENT OFFICE.

GEORGE N. WOLFE, OF WASHINGTON, PENNSYLVANIA, ASSIGNOR TO SIDWAY-TOP-LIFF COMPANY, OF WASHINGTON, PENNSYLVANIA.

VELOCIPEDE.

Application filed April 4, 1927. Serial No. 180,889.

This invention relates to self-propelled vehicles for children and has special reference to velocipedes; it being an object of the invention to so modify the construction of this type of vehicles as to permit of the immediate manufacture of the parts and the assembly thereof upon receipt of an order for these vehicles.

A further object of the invention resides in a novel arrangement of the bearings for the rear wheels whereby liability of loss of the wheels through loose nuts is practically eliminated.

Another object of the invention consists in the provision of a housing for the rear axle of the vehicle which will not only serve as a reinforcement for the vehicle frame and the axle, but also will permit removal of the axle when the vehicle is being crated or packed thereby greatly reducing the dimensions of the completed package.

A further object of the invention resides in the provision of an axle housing which has its ends extended beyond the frame proper of the vehicle and which thus serve as thrust bearings for the bearing containers in the hubs of the wheels and prevent the bearings from engaging the frame with a consequent increase of friction.

Other objects and advantages of the invention will develop as the description proceeds.

In the accompanying drawing:

Figure 1 is a side elevation of the novel velocipede.

Figure 2 is a fragmentary rear end view thereof, parts being shown in section; and Figure 3 is a detail sectional view taken on line 3—3 of Figure 1.

Referring to the drawing in greater detail, the numerals 1 and 2 designate the front and rear wheels respectively of the velocipede; the front wheel being provided with operating pedals 3 and mounted on the steering post 4 provided with the fork extension 5.

The frame of the velocipede comprises four sections of piping or tubing indicated by numerals 6, 7, 8 and 9. The forward end of the pipe or bar 6 is received in a socket 10 of a metal stamping 11, the latter being provided with a tubular portion 12 fitting around the steering post 4 and with extension 13 which are shaped to provide the socket 10 and which are riveted together as indicated by numeral 14. It will be observed that the socket 10 is inclined downwardly and that the forward end of the bar 6 is similarly inclined to be received in said socket. Withdrawal of the bar from the socket is prevented by means of a rivet 15 which passes through the walls of the socket and the forward end of the bar 6.

The rear end of the bar 6 is received and secured in a stamping 16 which is provided with the oppositely disposed sockets 17—18 and 19—20 respectively. The bar 6 is fixed in the upper socket 17 and is spaced from the rear axle housing 21 by means of the short tubing or bar 7 which has one end positioned in the socket 18 of the stamping and its other end fixed to the axle housing through the medium of the aperture 7' through which the housing is passed. The bracing bars 8 and 9 for the frame also have their upper ends fixed in the stamping 16 by means of the sockets 19 and 20 respectively and have their opposite ends secured to the axle housing 21 by means of the apertures 8' and 9' through which the axle housing is passed and secured. It will thus be apparent that these parts of the vehicle frame may be quickly assembled and that the parts themselves, including the stamping 16, may be constructed immediately upon receipt of an order, thus avoiding delays due to casting operations and the like. Furthermore it will be observed that the housing 21 serves as a reinforcement for the frame of the velocipede.

Extending through the axle housing 21 is the axle 22, and mounted on each end of the axle in abutting relation to the ends of the housing 21 is a sleeve 23 on which the wheels 2 are mounted. These sleeves are each provided with annular ribs 23' which grip into the inner wall of the ball bearing race with which each of the wheels is provided. The axle 22 is secured against longitudinal movement with respect to the axle housing by means of nuts 24 which are threaded to the ends of the axle, and which are inclosed by means of caps 25 which are clipped over the hubs of the wheels. Obviously there is little or no tendency for the nuts 24 to become unscrewed from the axle due to the fact that they are in contact with the ends of the sleeves 23 rather than the hubs of the wheels 2, and the sleeves are locked against turning by the fact that their inner ends are in tight frictional contact with the ends of the axle housing.

The housing 21 provides a support throughout the major portion of the axle 22 and thereby prevents bending of the axle and thus maintains the true alignment of the wheels. It should also be noted that the housing 21 extends slightly beyond the frame 8—9 as indicated by the numeral 21' and that these extensions provide in effect thrust bearings for the ball bearing containers of the wheels thereby preventing these bearings from rubbing against the frame of the vehicle and thus reducing friction.

The use of the axle housing 21 is also of paramount importance in that it permits the axle 22 to be removed or remain disassembled when packing the vehicle for shipment thereby greatly reducing the size of the container required.

In addition to the foregoing novel features the velocipede is of course provided with the usual seat 30, handle bars 31, tool kit 32, mud guard 33 and the like.

From the foregoing description it will be observed that I have devised a novel construction of velocipede frame which is readily and quickly constructed and assembled and which is strong and durable in operation. It will also be apparent that by reason of the novel arrangement of the rear axle a more reliable construction is provided which is free from the liability of damage to the vehicle or injury to the operator through loss of a wheel or axle by reason of the attaching nuts becoming disconnected.

The claims of the present application relate solely to the axle housing and associated parts; claims for other novel features of the invention being reserved for one or more divisional applications.

In accordance with the patent statutes I have described what I now believe to be the best embodiment of the invention, but it will be understood that various minor changes may be made in the details of construction without departing from the spirit of the invention; all such I aim to include in the scope of the appended claims.

What I claim as new and desire to secure by Letters Patent is:

1. In a velocipede structure, a load sustaining axle, a housing in which said axle is supported, said housing terminating short of the axle ends, sleeves arranged on said axle in abutting relation with the ends of the axle housing, and means for securing said sleeves against longitudinal movement with respect to the axle.

2. In a velocipede structure, a one-piece tubular axle housing, and a load sustaining axle non-rotatably mounted in said housing, and having its ends extending beyond the same.

3. In a velocipede structure, a load sustaining axle, a one-piece tubular housing of less length than the axle and in which said axle is non-rotatably supported, said housing being of such length as to extend slightly beyond said velocipede structure.

4. In a velocipede structure, a load sustaining axle, a one-piece tubular housing in which said axle is non-rotatably supported with its ends extending beyond the same, sleeves arranged on said axle in abutting relation with the ends of said housing.

5. In a velocipede structure, a load sustaining axle, a tubular housing of less length than the axle and in which said axle is non-rotatably supported, and non-rotating sleeves mounted on the ends of said axle.

6. In a velocipede structure, a load sustaining axle, a tubular housing having its ends extended beyond said velocipede structure and in which said axle is non-rotatably supported, said axle being of greater length than the housing, sleeves mounted on the ends of said axle, and means for forcing the sleeves into frictional engagement with the ends of the housing.

GEO. N. WOLFE.